United States Patent
Lehr et al.

(10) Patent No.: US 11,928,716 B2
(45) Date of Patent: Mar. 12, 2024

(54) RECOMMENDATION NON-TRANSITORY COMPUTER-READABLE MEDIUM, METHOD, AND SYSTEM FOR MICRO SERVICES

(71) Applicant: SAP SE, Walldorf (DE)

(72) Inventors: Matthias Lehr, Weinheim (DE); Fazlul Hoque, Weinheim (DE)

(73) Assignee: SAP SE, Walldorf (DE)

( * ) Notice: Subject to any disclaimer, the term of this patent is extended or adjusted under 35 U.S.C. 154(b) by 937 days.

(21) Appl. No.: 15/847,920

(22) Filed: Dec. 20, 2017

(65) Prior Publication Data
US 2019/0188774 A1 Jun. 20, 2019

(51) Int. Cl.
| | |
|---|---|
| G06Q 30/00 | (2023.01) |
| G06N 5/022 | (2023.01) |
| G06N 5/025 | (2023.01) |
| G06N 20/00 | (2019.01) |
| G06Q 10/0637 | (2023.01) |
| G06Q 30/0601 | (2023.01) |

(52) U.S. Cl.
CPC ......... *G06Q 30/0631* (2013.01); *G06N 5/022* (2013.01); *G06N 5/025* (2013.01); *G06N 20/00* (2019.01); *G06Q 10/0637* (2013.01)

(58) Field of Classification Search
None
See application file for complete search history.

(56) References Cited

U.S. PATENT DOCUMENTS

| | | |
|---|---|---|
| 2002/0083067 A1 | 6/2002 | Tamayo et al. |
| 2005/0102292 A1 | 5/2005 | Tamayo et al. |
| (Continued) | | |

FOREIGN PATENT DOCUMENTS

| | | |
|---|---|---|
| EP | 2801935 | 11/2014 |
| EP | 2801938 | 11/2014 |

OTHER PUBLICATIONS

Polze, A., Timely Virtual Machine Migration for Pro-active Fault Tolerance, Mar. 1, 2011, 2011 14th IEEE International Symposium on Object/Component/Service-Oriented Real-Time Distributed Computing Workshops, pp. 234-243 (Year: 2011).*

(Continued)

*Primary Examiner* — Jeffrey A. Smith
*Assistant Examiner* — Timothy J Kang
(74) *Attorney, Agent, or Firm* — Fish & Richardson P.C.

(57) ABSTRACT

A request is received to perform an exploration in a predictive and maintenance service application. A sequence of explorations is added in an evidence package. The evidence package includes the list of micro services. The sequence of explorations in the evidence package are analyzed. Based on the analysis, a user behavior corresponding to the performed exploration is identified. The user behavior is provided as input to the machine learning algorithm. Configuration data corresponding to the exploration and the evidence package is stored in a configuration database. The machine learning algorithm is executed in an execution engine. The execution engine is a micro service. Based on execution of the machine learning algorithm, the list of micro services is automatically identified as recommendations. The list of micro services is displayed as recommendations in the predictive and maintenance service application.

18 Claims, 8 Drawing Sheets

(56) References Cited

U.S. PATENT DOCUMENTS

| | | | | |
|---|---|---|---|---|
| 2008/0244527 | A1* | 10/2008 | Chang | G06F 8/20 |
| | | | | 717/127 |
| 2012/0310681 | A1* | 12/2012 | Simon | G06Q 10/0633 |
| | | | | 705/7.11 |
| 2015/0363863 | A1 | 12/2015 | Jurgenson et al. | |
| 2017/0257303 | A1* | 9/2017 | Boyapalle | H04L 67/34 |
| 2018/0018590 | A1* | 1/2018 | Szeto | G06N 20/00 |
| 2018/0174059 | A1 | 6/2018 | Banerjee | |
| 2018/0239762 | A1* | 8/2018 | Takeuchi | G06N 20/00 |
| 2018/0331928 | A1* | 11/2018 | Dave | G06N 5/04 |

OTHER PUBLICATIONS

Extended European Search Report issued in European Application No. 18210028.9, dated May 24, 2019, 153 pages.
Communication Pursuant to Article 94 (3) EPC issued in European Application No. 18210028.9 dated Dec. 16, 2020, 7 pages.
He et al., "Interactive recommender systems: A survey of the state of the art and future research challenges and opportunities." Expert Systems with Applications 56, 2016, 9-27, 19 pages.
Kim et al., "Collaborative user modeling for enhanced content filtering in recommender systems." Decision Support Systems 51.4, 2011, 772-781, 10 pages.
Office Action in European Appln. No. 18210028.9, dated Feb. 11, 2022, 17 pages.
Oral Proceedings in European Appln. No. 18210028.9, mailed on Jan. 14, 2022, 12 pages.
Wikipedia.org [online], "Microservices" Dec. 14, 2017, retrieved on Jan. 10, 2022, retrieved from URL <https://en.wikipedia.org/w/index.php?title=Microservices&oldid=815319593>, 7 pages.

* cited by examiner

NEW EXPLORATION 202

MACHINE EXPLORATION 204

| FILTER BY FUNCTIONAL LOCATION | ☐ | ID | TYPE | ALERTS | HEALTH SCORE (LAST 24 HOURS) |
|---|---|---|---|---|---|
| PL22 | ☐ | TRR-2000-32 | WHOLE LOCOMOTIVE | 1 | 32 |
| HS500001 | ☐ | EGV-700-27 | WHOLE LOCOMOTIVE | 1 | 53 |
| HS500002 | ☐ | LON-1000-18 | WHOLE LOCOMOTIVE | 1 | 60 |
| HS500003 | ☐ | RTO-500-2 | WHOLE LOCOMOTIVE | 1 | 64 |
| HS500004 | ☐ | TTR-2000-33 | WHOLE LOCOMOTIVE | 2 | 71 |
| HS500005 | ☐ | TTR-2000-34 | WHOLE LOCOMOTIVE | 3 | 74 |
| HS500006 | ☐ | LON-1000-56 | WHOLE LOCOMOTIVE | 1 | 79 |
| HS500007 | ☐ | EGV-700-12 | WHOLE LOCOMOTIVE | 0 | 82 |
| HS500008 | ☐ | LON-1000-24 | WHOLE LOCOMOTIVE | 4 | 94 |
| HS500009 | ☐ | EGV-700-32 | WHOLE LOCOMOTIVE | 2 | 96 |

206

ADD MICRO SERVICE 208

FIG. 2A

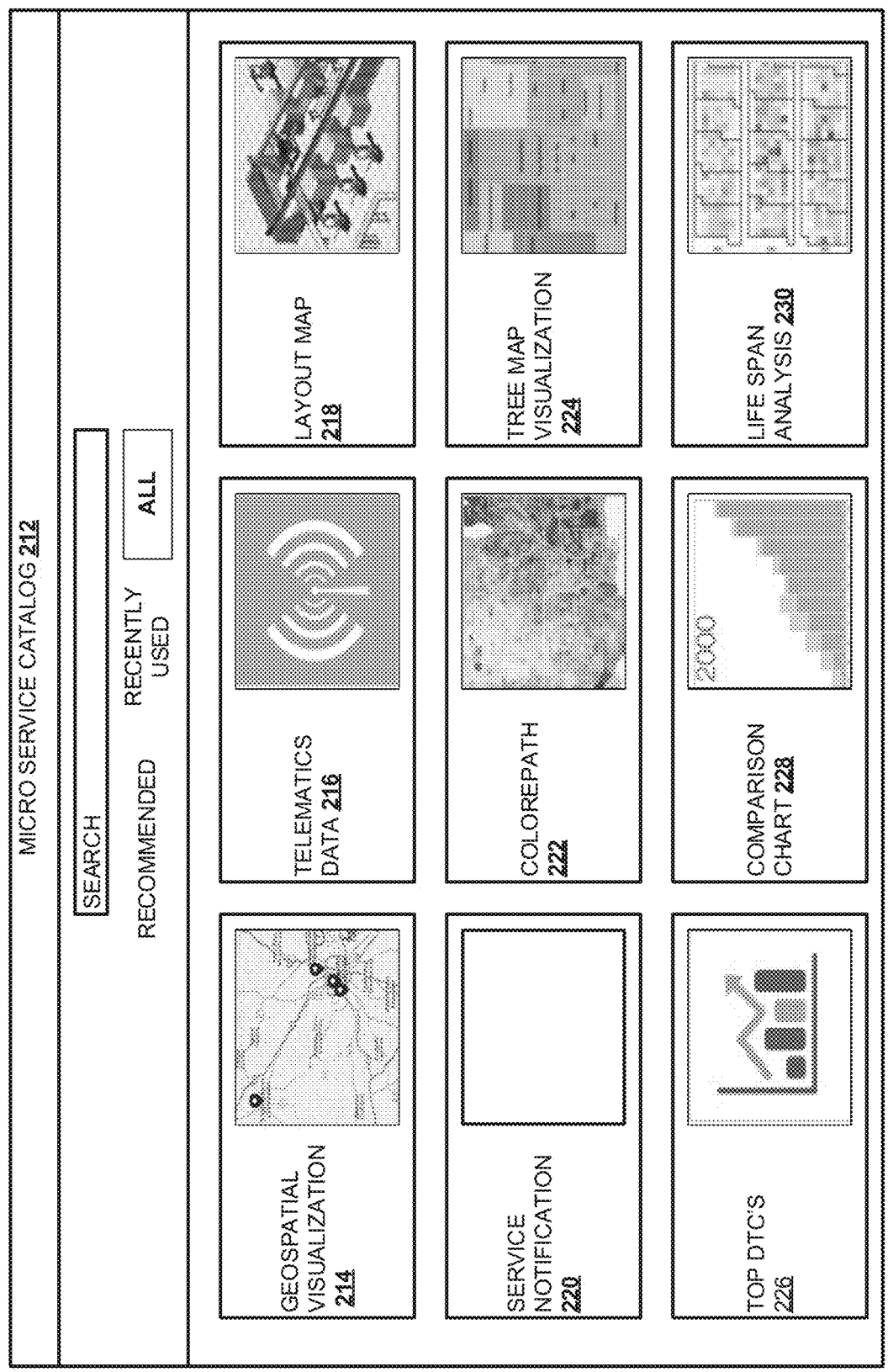

RECOMMENDATION NON-TRANSITORY COMPUTER-READABLE MEDIUM, METHOD, AND SYSTEM FOR MICRO SERVICES

FIELD

Illustrated embodiments generally relate to data processing, and more particularly to recommendation engine for micro services.

BACKGROUND

An enterprise solution, offering maintenance and service, aims to improve the visibility of health of assets such as hardware assets, and to prevent failures. A user of the enterprise solution is provided proactively with alerts and information of the hardware assets. To identify a specific hardware asset having problems, an in-depth understanding of the state and health of the hardware asset is required. Exploration and analysis of data collected for the individual hardware assets over a period of time is used to enable the user to build this understanding. The volume of data collected for the individual hardware assets appear as information overload when displayed to the user. Since the data collected appears as information overload prior to exploration, various application and software tools may be used for such exploration. However, it is challenging to automatically identify a right combination of application and software tools to drill down to the data collected for a specific hardware asset corresponding to an alert.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. Various embodiments, together with their advantages, may be best understood from the following detailed description taken in conjunction with the accompanying drawings.

FIG. 2A, FIG. 2B and FIG. 2C are block diagrams illustrating user interfaces of an enterprise application showing user behavior, according to one embodiment.

DETAILED DESCRIPTION

Embodiments of techniques of a recommendation engine for micro services are described herein. In the following description, numerous specific details are set forth to provide a thorough understanding of the embodiments. A person of ordinary skill in the relevant art will recognize, however, that the embodiments can be practiced without one or more of the specific details, or with other methods, components, materials, etc. In some instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
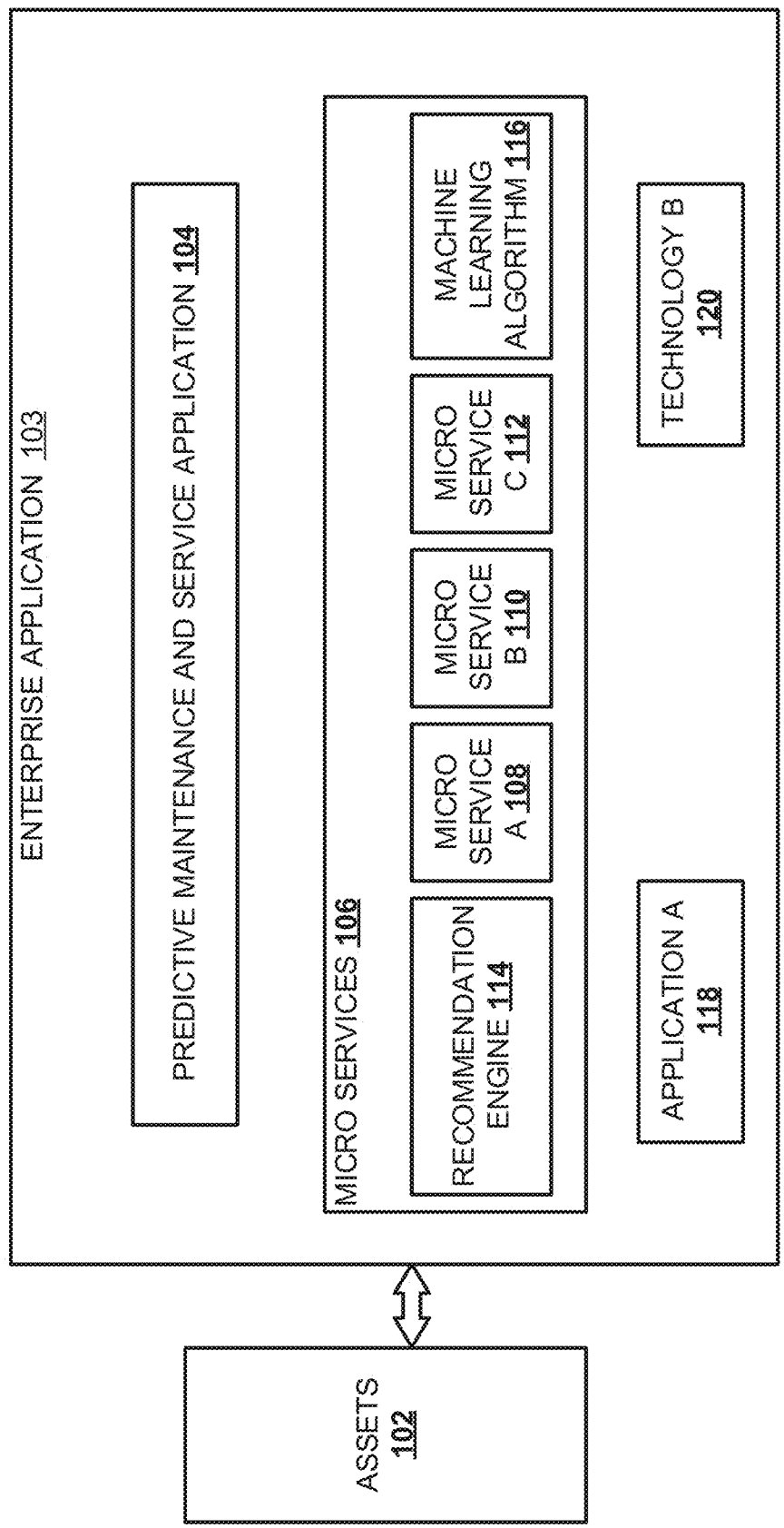
FIG. 1 is a block diagram illustrating functional architecture of an enterprise application with recommendation engine for micro services, according to one embodiment.

FIG. 1 is block diagram illustrating functional architecture of an enterprise application with recommendation engine for micro services, according to one embodiment. An asset may be a hardware asset such as devices, machines, sensors, etc. Assets 102 are connected to enterprise application 103 such as predictive maintenance and service application 104. Predictive maintenance and service application 104 provides a user with a holistic management of asset health and decision support for maintenance schedules and optimization of resources based on health scores, anomaly detection, etc. Various modules in the predictive maintenance and service application 104 provide details of a specific asset and its components, and monitor the health status of the asset while they are in operation. Micro services 106 are a variant of service-oriented architecture that structures an application as a collection of loosely coupled services. An individual micro service provides a specific functionality, and can be implemented using various programming languages, databases, hardware and software environments. The micro services are autonomously developed, independently deployable, and decentralized. Various micro services 106 are micro service A 108, micro service B 110, micro service C 112, etc. Some examples of micro services are 3D charts, telematics data, service notifications, tree map visualization, top diagnostic trouble codes (DTC's), life span analysis, etc.

The individual micro service may provide output in the form of visualization in a graphical user interface. The micro service is also referred to as insight provider, providing various insights to explore information about the health of the asset. Recommendation engine 114 is a part of the micro services 106. The recommendation engine 114 for the micro services is a machine language based filtering system that predicts the relevant micro services needed for an analysis and proposes them to a user during an exploration. The user behavior is learned over a period of time, and the past explorations of the user are analyzed. If a past exploration of the user was successful, then it is very likely that the usage of the same micro services for data analysis in a current exploration may be suitable again. The recommendation engine 114 for micro services 106 makes use of a machine learning algorithm 116 associated with a predictive maintenance and service application 104. Various applications/technologies and platforms may coordinate with the micro services 106 to provide various functionalities, for example, application A 118 may be a predictive analysis enterprise application used to uncover trends and patterns from existing data sources. Technology B 120 may be a column based relational database software system used for business intelligence, data warehousing and data marts.

Figure 2C:
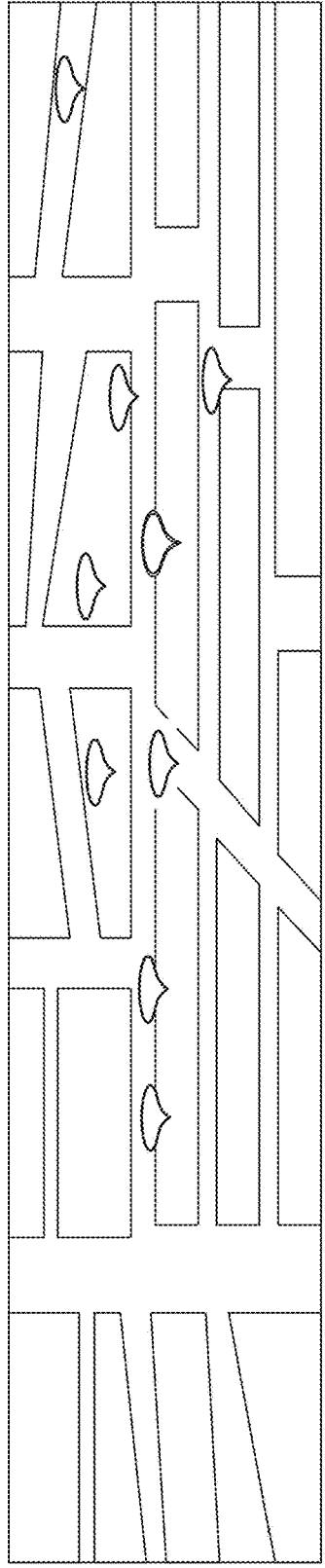

FIG. 2A, FIG. 2B and FIG. 2C are block diagrams illustrating user interfaces of an enterprise application showing a user behavior, according to one embodiment. A user starts a new exploration by clicking on new exploration 202 (not shown) to analyze assets such as rail transport vehicles, e.g. trains. The request to perform the new exploration is received in a predictive and maintenance service application. For example, the new exploration 202 may be machine exploration 204 with list of asset identifiers, type of asset, alerts, etc., as shown in 206. The user may add a new micro service to the machine exploration by clicking on 'add micro service' 208 as shown in FIG. 2A. When the user clicks on 'add micro service' 208, a list of micro services 210 is displayed in a micro service catalog 212 as shown in FIG. 2B. The list of micro services in the micro service catalog 212 are explained below. The micro service geospatial visualization 214 provides a visual display of geographical location of the assets in a satellite view. The micro service telematics data 216 provides visual monitoring of the exact location of the asset based on global positioning system (GPS). The micro service layout map 218, provides a map to visualize three-dimensional layout floorplans of production lines and construction sites. Service notification 220 provides service or maintenance notifications in a visual representation. The micro service colorepath 222 analyses data and presents a summary of results in a visual manner. The micro service tree map visualization 224 provides a summary of results in a hierarchical nested format usually in rectangles. The micro service top diagnostic trouble codes (DTC's) 226 shows the list of top DTCs for a set of defined assets over a specified time period. The sensors record the health status of the assets, and produce DTC's. The micro service comparison chart 228 provides a summary of results in the form of charts for comparison. The micro service life span analysis 230 provides a summary of results of life span of assets in a visual manner. The user may select micro services such as geospatial visualization 214, telematics data 216, service notifications 220 and tree map visualization 224 during the exploration. The sequence of explorations 232 by the user may be added as evidence in an evidence package 234 as shown in FIG. 2C.

The evidence package is a collection of various exploration results 'saved' by the user while exploring diverse data sources to identify potential root cause of an issue. Similarly, various filters and selection of assets may be added to the evidence package. In the example above, the user may add a visual display of geospatial visualization 214, telematics data 216, service notifications 220 and tree map visualization 224, a filter: onboarding, and selection of five assets such as trains, and add it to the evidence package. If this exploration was successful, the status of the exploration will be marked as successfully closed. This indicates that the exploration for the train assets was successful, and the series of exploration recorded in the evidence package may be used by a subsequent user to perform a successful exploration. The exploration along with the status successfully closed is stored in a storage. The evidence package includes micro-level metadata corresponding to tracking the exploration performed by the individual users, search terms provided as input for analysis, the list of micro services selected, etc. The evidence package including the micro-level metadata represents the user behavior, and is provided as input to a machine learning algorithm. The machine learning algorithm receives the evidence packages as input, performs analysis and learns the user behavior and predicts a list of recommended micro service as output. In a similar manner, the evidence packages generated in the enterprise application is provided as input to the machine learning algorithm for analysis. Subsequently used when a different user tries to perform the same or similar exploration, the predicted list of recommended micro services is provided as output to the user.

Figure 3:
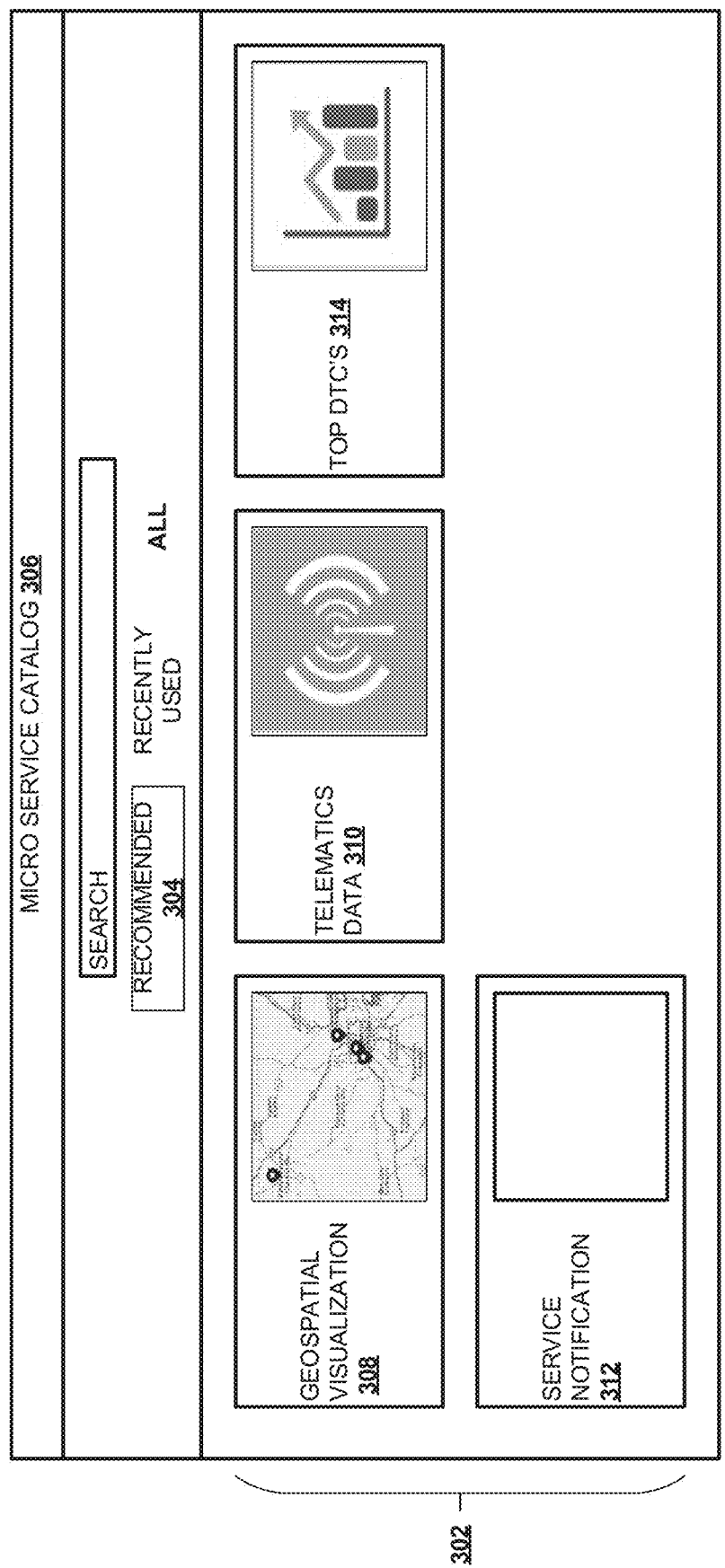
FIG. 3 is block diagram illustrating a user interface of an enterprise application showing recommendation of micro services, according to one embodiment.

FIG. 3 is a block diagram illustrating a user interface of an enterprise application showing recommendation of micro services, according to one embodiment. A request to perform exploration in the enterprise application is received from a user, for example, the user may perform the exploration to analyze assets such as rail transport vehicles, e.g. trains. Based on the received request, a recommendation engine using machine learning algorithms automatically identifies that the requested exploration is similar to a past exploration, and hence analyzes an evidence package associated with the past exploration. Recommendation engine for the micro services is a machine language based filtering system that automatically predicts the relevant micro services needed for an analysis and proposes them to the user during an exploration. Automatically identified or automatically predicted indicates that identification/prediction takes place automatically without human intervention. Based on the analyzed evidence package, a list of micro services 302 used in the past exploration is provided or displayed in the recommendation tab 304. Over a period of time, successful explorations are analyzed and learned by the recommendation engine, and the evidence packages associated with those successful explorations are analyzed by machine learning algorithms.

Based on the analysis by the machine learning algorithms, the list of micro services that lead to successful exploration is identified. The identified list of micro services 302 is displayed in the recommended tab 304 in the micro service catalog 306. For example, the list of micro services provided as recommendation is geospatial visualization 308, telematics data 310, service notifications 312 and top diagnostic trouble codes (DTC's) 314. The micro service geospatial visualization 308 provides a map visualization that allows you to plot your objects and analyze them on a geographical distribution. The micro service telematics data 310 analyzes data sets and presents a summary of results is a visual representation. The micro service map provides a display of assets and their health scores by geolocation and issue severity. The micro service, service notification 312 analyzes data sets and presents a summary of results in a visual representation. The top DTC's 314 shows the list of top DTCs for a set of defined assets over a specified time period. The sensors record the health status of the assets, and produce DTC's.

Figure 4:
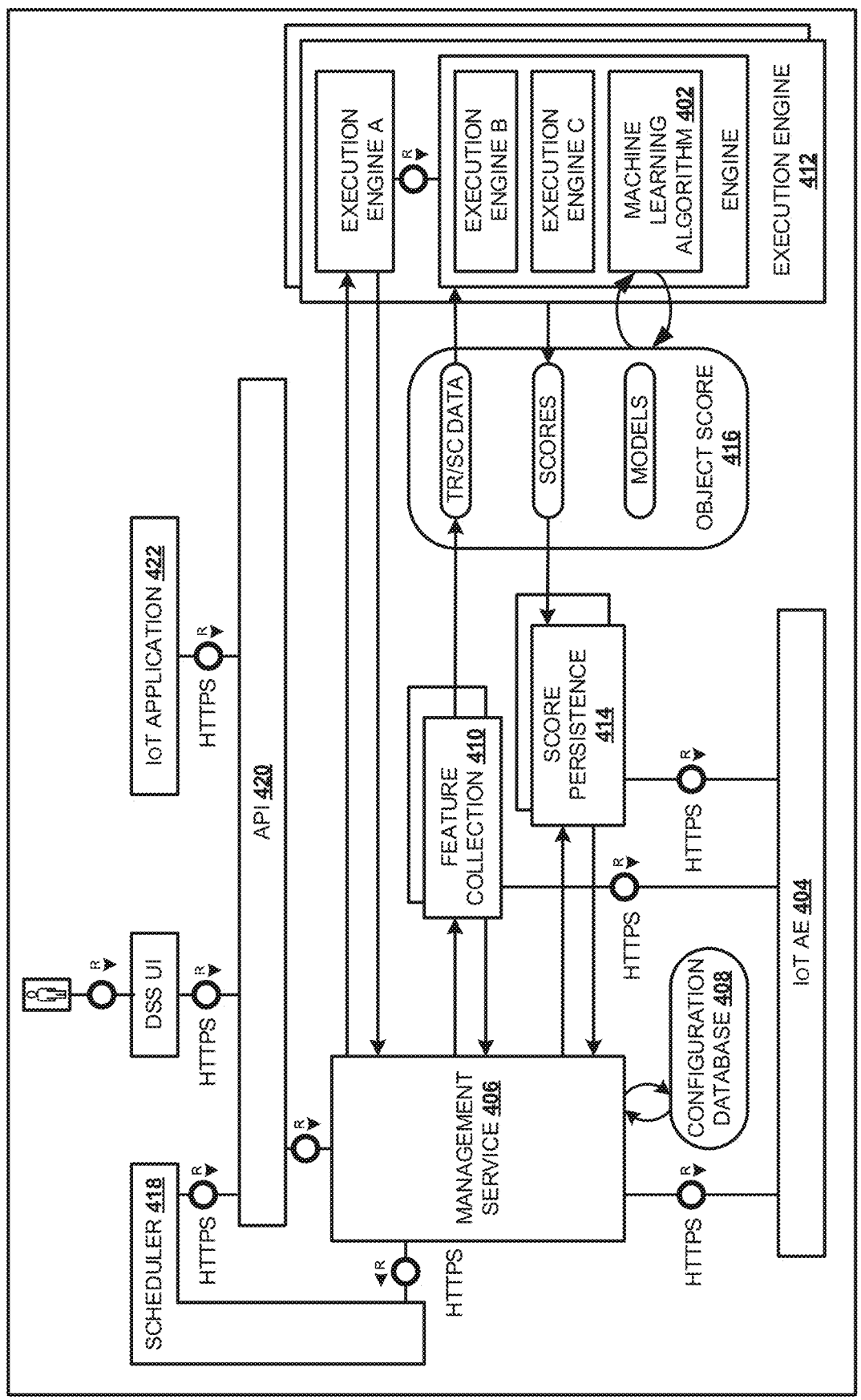
FIG. 4 is a block diagram illustrating architecture of machine learning engine used by recommendation engine, according to one embodiment.

FIG. 4 is block diagram illustrating architecture of machine learning algorithm used by recommendation engine, according to one embodiment. The recommendation engine for micro services makes use of a machine learning algorithm 402 associated with a predictive maintenance and service application. User behavior or information corresponding to a user such as explorations and evidence packages are provided as input to the machine learning algorithm 402. Data science services in predictive maintenance and service applications supports data modelling and deployment. In data modelling, data models are created, configured and run. Data science services in predictive maintenance and service applications is a data science and machine learning algorithm that is integrated with internet of things (IoT) application enablement (AE) 404. IoT AE 404 facilitates digital representation of real-world objects, and micro services become actionable by integrating with IOT AE 404. The explorations and evidence packages are persisted through a module in the IOT AE 404 in parallel to persisting assets and other metadata.

Management service 406 provides API (application programming interface) for model management, job management and dataset configuration. The configuration details are stored in configuration database 408. The management service 406 enables storing the configuration details corresponding to the explorations and evidence packages. Feature collection 410 micro service is used to retrieve data from a variety of sources, and save it as an analytical record into a location accessible by the execution engine 412. For example, exploration and evidence package data are stored as time series data in time series stores. Time series data are events collected at periodic or regular intervals of time. The evidence packages are extracted from time series storage and prepared. A model is learned by computing the distance of individual evidence package in the exploration with a past reference evidence package of successful exploration stored in the time series storage. The computed distance is stored in the time series storage. A score is associated with the model, and the model is ranked. The model with the highest rank above a pre-defined threshold for example, rank 4 or rank 6, etc., is considered as the exploration that is relevant to the current exploration. The model with the highest rank corresponds to one or more evidence packages, and the micro services in the evidence packages are automatically provided as recommendation by the recommendation engine.

The computed scores are persisted in the score persistence 414 module. A score persistence micro service is used to transfer scores computed for the models to IOT AE 404-time series store. Object store 416 enables the storage of objects and involves creation, upload, download and deletion of objects such as scores, models, etc. For example, the model learned in the above example may be stored as an object in the object store 416. Execution engine 412 is a micro service that executes the machine learning algorithm 402. An execution engine 412 instance processes task(s), and several execution engine instances can be active at the same time.

The machine learning algorithm 402 in the execution engine 412, the scheduler 418 enables users to setup scheduled executions of model scoring jobs. API 420 is used as interface for IOT application 422. Using various machine learning algorithms for the recommendation engine, the explorations and associated evidence packages are analyzed, and the list of most appropriate micro services are automatically identified. The identified micro services are displayed in a recommended tab in the prediction and maintenance service application. The evidence package corresponding to the model is retrieved, and the micro services in the evidence package are automatically identified as relevant micro services to the current exploration. The identified micro services are displayed in the recommended tab in the predictive maintenance and service application.

In one embodiment, data mining algorithm such as association rule mining may be used. User behavior or information corresponding to a user such as successful explorations and evidence packages are provided as input to the data mining algorithm in the machine learning execution engine. Analysis is performed on the list of micro services provided in the successful explorations and evidence packages, for discovering uncovered relationships based on the frequency of occurrence of individual micro services. The uncovered relationships can be represented in the form of rules. To generate rules, various data mining algorithms such as Apriori algorithm, DSM-FI, etc., can be used. In order to find frequent micro services, support and confidence of micro services are determined. The strength of a rule X→Y can be measured in terms of its support and confidence. Support determines frequency of occurrence of micro services X and Y appearing together in an evidence package, while confidence determines how frequently Y appears in evidence package that contains X. Support could be calculated using a formula:

$$\text{Support}(X \to Y) = \frac{\text{Count}(X \cup Y)}{N}$$

where X and Y may represent any micro service, count (X∪Y) represents a count where both micro services X and Y occur in individual context/evidence package, and N represents the total number of micro services in the dataset. Confidence is calculated using a formula:

$$\text{Confidence }(X \to Y) = \frac{\text{Count}(X \cup Y)}{\text{Count}(X)}$$

where X and Y may represent any micro service, count (X∪Y) represents a count where both micro services X and Y occur in individual evidence package, and count (X) represents the count where micro service X occurs in individual evidence package. For finding rules, a value of minimum support for example 0.2 or 0.3, and a value of minimum confidence for example 0.3 or 0.5, are fixed to filter rules that have a support value and a confidence value greater than this minimum threshold. The micro services having the minimum support value are determined as frequent micro services. Based on the determined micro services, rules can be generated using Apriori algorithm. Using Apriori algorithm, a rule of the type X→Y is formed if the confidence of the rule X→Y is greater than the minimum confidence specified to filter the rules. The rules with a confidence value above the specified threshold value is selected, and the micro services corresponding to those rules are automatically provided as recommendation by the recommendation engine. Both methods explained above can be combined to strengthen the recommendation by using the scores and support/confidence values.

In one embodiment, a data mining algorithm such as classification algorithm may be used. User behavior or information corresponding to a user such as successful explorations and evidence packages are provided as input to the data mining algorithm in the machine learning execution engine. Analysis is performed on the list of micro services available in the successful explorations and evidence packages. Using a clustering algorithm such as k-means clustering algorithm, the micro services in the successful evidence packages are clustered. When a new request for exploration is received from a user, the current exploration is checked against the explorations clustered using k-means algorithm. Based on the check, a cluster that is similar to the exploration requested may be identified, and the micro services in the identified cluster are automatically provided as recommendation by the recommendation engine.

Figure 5:
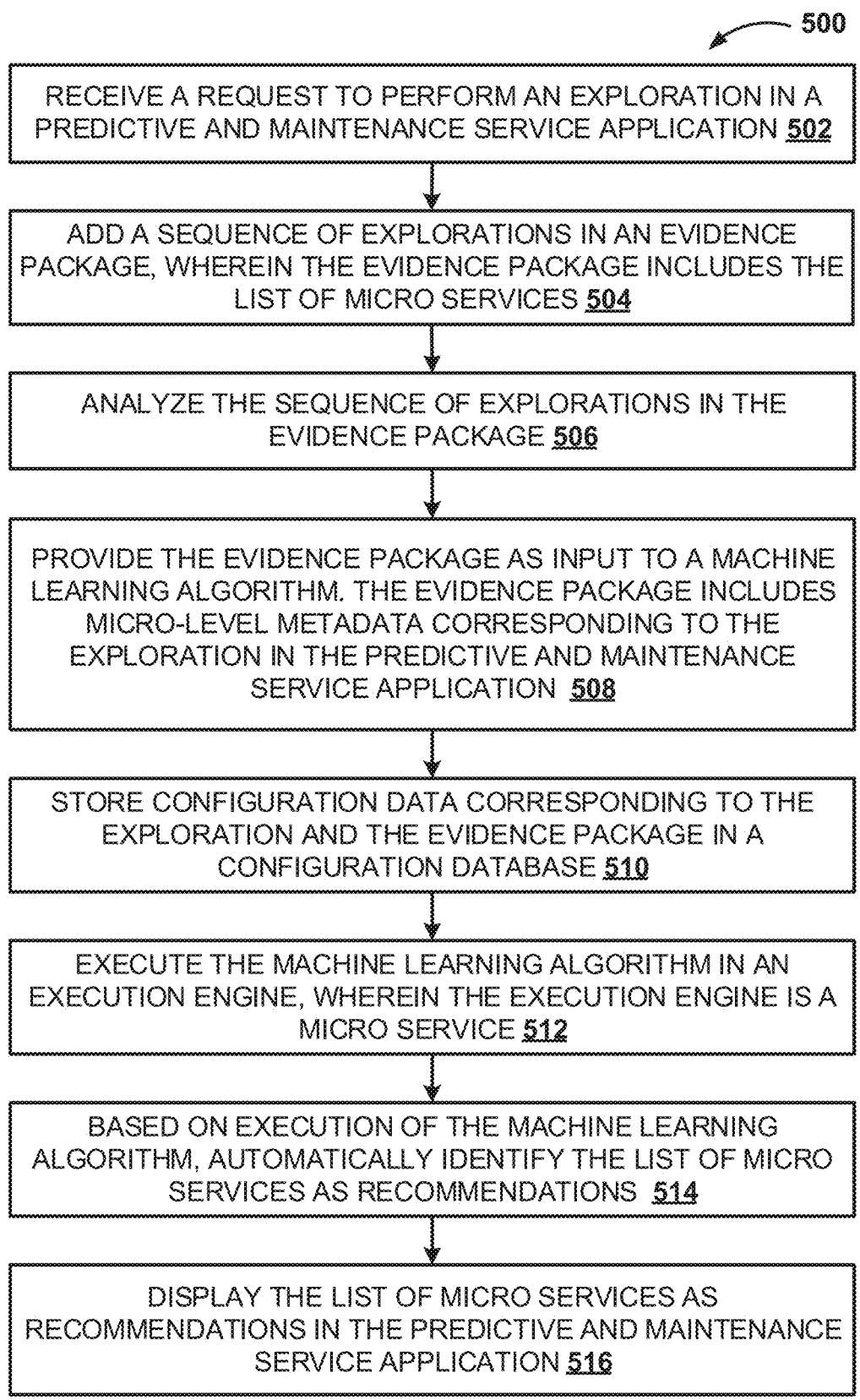
FIG. 5 is a flow chart illustrating process for recommendation engine for micro services, according to one embodiment.

FIG. 5 is flow chart illustrating process 500 for recommendation engine for micro services, according to one embodiment. At 502, a request is received to perform an exploration in a predictive and maintenance service application. At 504, a sequence of explorations is added in an evidence package. The evidence package includes the list of micro services. At 506, the sequence of explorations in the evidence package are analyzed. At 508, the evidence package is provided as input to a machine learning algorithm.

The evidence package includes micro-level metadata corresponding to the exploration in the predictive and maintenance service application. At 510, configuration data corresponding to the exploration and the evidence package is stored in a configuration database. At 512, the machine learning algorithm is executed in an execution engine. The execution engine is a micro service. Based on execution of the machine learning algorithm, at 514, the list of micro services is automatically identified as recommendations. At 516, the list of micro services is displayed as recommendations in the predictive and maintenance service application.

The above explained embodiments have various advantages for end users, developers of micro services as well as the predictive maintenance and service application itself. For example, when an end user tries to explore and identify a list of assets e.g., trains that require service or are due service maintenance. Typically, a large number, e.g., hundreds, of micro services are available to the user for exploring and analysis. Based on the recommendation engine, the user may be recommended a list of micro services including a few of the multitude of available micro services and their variances. The user's time is saved since, e.g., the user has to spend few minutes on the recommended micro services instead of hours on the hundreds of available micro services. The user may also find new micro services because of the recommendation engine which otherwise would remain unknown. Therefore, discovery as well as efficiency of the user is improved by using the recommendation engine for micro services.

For the developers of micro-services, understanding what kind of micro services are typically used together gives them a better insight of the user requirements and thus improve the development of these micro services. For example, if it is observed that a list of alert micro services is often used with a 2D chart visualization micro service, it might be deduced that the end user wants to always see one or more alert in a time series representation. The developers may then decide to make this functionality easier to use and adapt the existing micro services, perhaps even combine them into a single micro service. For the predictive maintenance and service application, the possibility of learning the typical combination of micro services increases its intelligence of recommendation based on the collective usage of recommendation engine/insight providers across all users. The learning from one analysis can be now be potentially used in other cases which is the basic objective of automation. The recommendation engine provides accurate recommendations and this implies reliable and trust worthy recommendation of micro services.

Some embodiments may include the above-described methods being written as one or more software components. These components, and the functionality associated with each, may be used by client, server, distributed, or peer computer systems. These components may be written in a computer language corresponding to one or more programming languages such as functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits (ASICs), programmable logic devices (PLDs) and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 6:
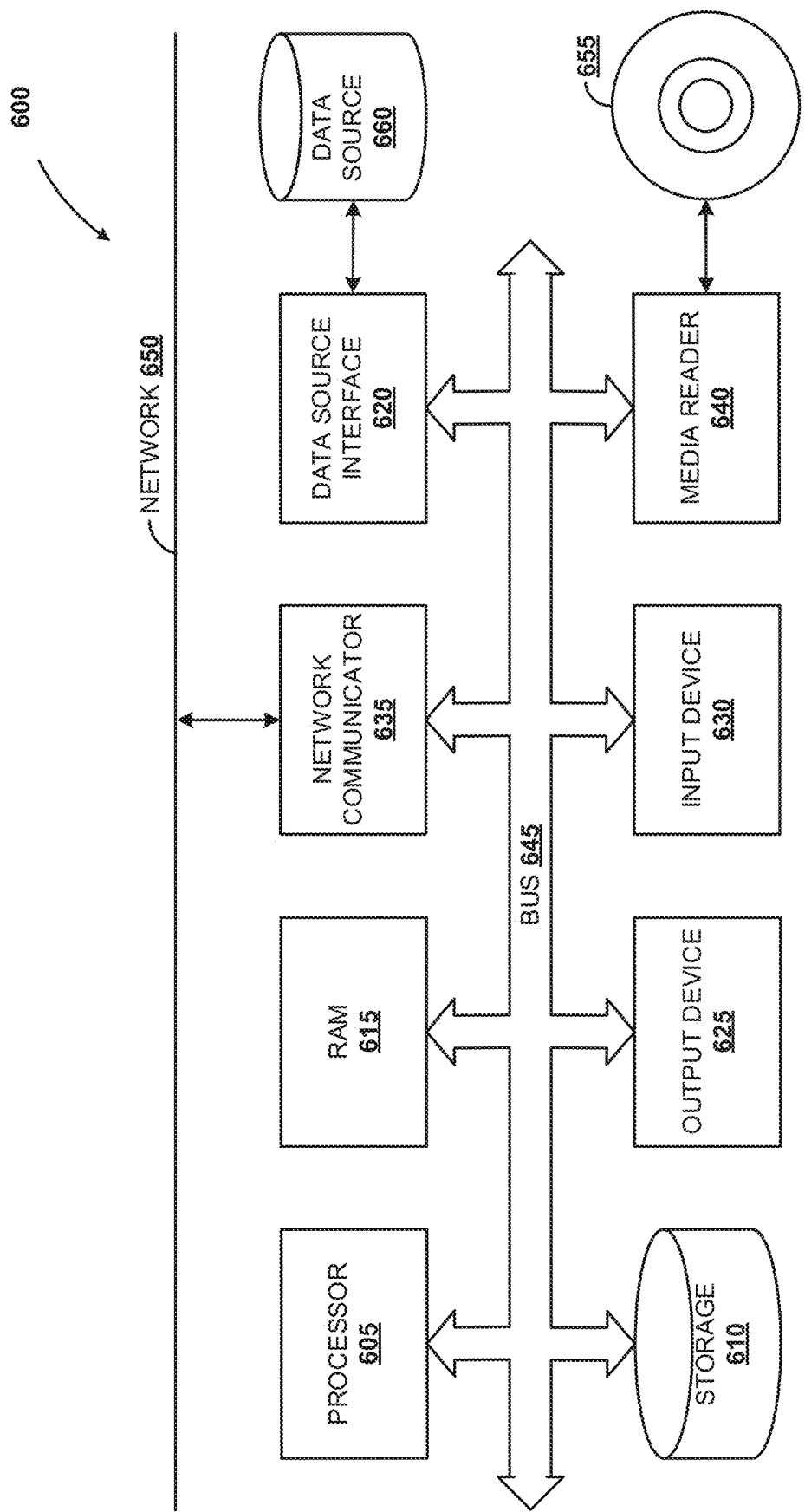
FIG. 6 is a block diagram of an exemplary computer system, according to one embodiment.

FIG. 6 is a block diagram of an exemplary computer system 600. The computer system 600 includes a processor 605 that executes software instructions or code stored on a computer readable storage medium 655 to perform the above-illustrated methods. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. The stored instructions may be further compiled to generate other representations of the instructions and dynamically stored in the RAM 615. The processor 605 reads instructions from the RAM 615 and performs actions as instructed. According to one embodiment, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed by network 650. In some embodiments the data source 660 may be accessed via an abstraction layer, such as a semantic layer.

A data source is an information resource. Data sources include sources of data that enable data storage and retrieval. Data sources may include databases, such as relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A non-transitory computer-readable medium to store instructions, which when executed by a computer, cause the computer to perform operations comprising:
    receiving, via a graphical user interface (GUI), a first request to perform an exploration in a predictive and maintenance service application;
    in response to the receiving the first request:
        creating the exploration;
        recording a series of actions performed during the exploration in a storage using a processor of the computer, wherein the recorded series of actions performed during the exploration tracks at least the actions performed, inputs provided for analysis, and micro services selected to perform root cause analysis of an issue during the exploration; and
        saving the exploration in an evidence package in the storage, wherein the evidence package comprises a collection of explorations including the current exploration;
    determining a predicted list of recommended micro services for the exploration using the processor that executes a machine learning algorithm to perform an analysis of the evidence package comprising the collection of explorations in the storage;
    receiving a second request to perform the exploration in the predictive and maintenance service application, the second request occurring after the first request;
    in response to the receiving the second request, in a recommendation engine, automatically identifying a list of micro services based on the determined predicted list of recommended micro services for the exploration, wherein automatically identifying the list of micro services further comprises:
        learning, by the machine learning algorithm, a corresponding model as a corresponding learned model by computing a corresponding distance of the evidence package with each successful evidence package of successful evidence packages previously saved in time series storage; and
        ranking each corresponding learned model of the learned models based on the computed corresponding distance, wherein the identified list of micro services further includes individual micro services in one or more successful evidence packages that correspond to the learned model of the learned models having the highest rank above a pre-defined threshold; and
    displaying, via the GUI, the list of micro services as recommendations for performing the exploration in the predictive and maintenance service application.

2. The non-transitory computer-readable medium of claim 1, wherein a micro service is a variant of service-oriented architecture that structures an application corresponding to the micro service as a collection of loosely coupled services.

3. The non-transitory computer-readable medium of claim 1, wherein performing the exploration in the predictive and maintenance service application which when executed by the computer further cause the computer to perform operations comprising:
    adding a sequence of explorations in an evidence package, wherein the evidence package includes the list of recommended micro services for each exploration determined by executing the machine learning algorithm; and
    storing the exploration along with a status in the storage.

4. The non-transitory computer-readable medium of claim 3, further comprises instructions which when executed by the computer further cause the computer to:
    in the recommendation engine:
        provide the evidence package as input to the machine learning algorithm, wherein the evidence package includes micro-level metadata corresponding to the exploration in the predictive and maintenance service application.

5. The non-transitory computer-readable medium of claim 4, wherein the recommendation engine is a machine language based filtering system that predicts the list of micro services to perform the exploration.

6. The non-transitory computer-readable medium of claim 4, wherein the evidence package with a successfully closed status is provided as input to the machine learning algorithm.

7. The non-transitory computer-readable medium of claim 1, further comprises instructions which when executed by the computer further cause the computer to:
   if the exploration based on the list of recommended micro services was successful, a status of the exploration is marked as successfully closed indicating that the root cause of the issue was identified and the series of actions performed during the exploration recorded in the evidence package is available to use in a subsequent exploration; and
   if the exploration based on the list of recommended micro services was not successful, the status of the exploration is not marked as successfully closed.

8. A computer-implemented method of a recommendation engine for micro services, the method comprising:
   receiving, via a graphical user interface (GUI), a first request to perform an exploration in a predictive and maintenance service application;
   in response to the receiving the first request:
      creating the exploration;
      recording a series of actions performed during the exploration in a storage using a processor of the computer, wherein the recorded series of actions performed during the exploration tracks at least the actions performed, inputs provided for analysis, and micro services selected to perform root cause analysis of an issue during the exploration; and
      saving the exploration in an evidence package in the storage, wherein the evidence package comprises a collection of explorations including the current exploration;
   determining a predicted list of recommended micro services for the exploration using the processor that executes a machine learning algorithm to perform an analysis of the evidence package comprising the collection of explorations in the storage;
   receiving a second request to perform the exploration in the predictive and maintenance service application, the second request occurring after the first request;
   in response to the receiving the second request, in a recommendation engine, automatically identifying a list of micro services based on the determined predicted list of recommended micro services for the exploration, wherein automatically identifying the list of micro services further comprises:
      clustering, using a clustering algorithm, individual micro services in previously saved successful explorations and evidence packages;
      checking a current list of micro services in the evidence package against the individual micro services clustered by the clustering algorithm; and
      based on checking the current list of micro services, identifying a cluster of the individual micro services that is similar to the current list of micro services in the evidence package, wherein the identified list of micro services further includes the individual micro services in the identified cluster; and
   displaying, via the GUI, the list of micro services as recommendations for performing the exploration in the predictive and maintenance service application.

9. The method of claim 8, wherein a micro service is a variant of service-oriented architecture that structures an application corresponding to the micro service as a collection of loosely coupled services.

10. The method of claim 9, wherein performing the exploration in the predictive and maintenance service application further comprising:
   adding a sequence of explorations in an evidence package, wherein the evidence package includes the list of recommended micro services for each exploration determined by executing the machine learning algorithm; and
   storing the exploration along with a status in the storage.

11. The method of claim 10, further comprising:
   in the recommendation engine:
      providing the evidence package as input to the machine learning algorithm, wherein the evidence package includes micro-level metadata corresponding to the exploration in the predictive and maintenance service application.

12. The method of claim 11, wherein the recommendation engine is a machine language based filtering system that predicts the list of micro services to perform the exploration.

13. The method of claim 11, wherein the evidence package with a successfully closed status is provided as input to the machine learning algorithm.

14. A computer system implementing a recommendation engine for micro services, comprising:
   a computer memory to store program code; and
   a processor to execute the program code to perform operations comprising:
      receiving, via a graphical user interface (GUI), a first request to perform an exploration in a predictive and maintenance service application;
      in response to the receiving the first request:
         creating the exploration;
         recording a series of actions performed during the exploration in a storage using a processor of the computer, wherein the recorded series of actions performed during the exploration tracks at least the actions performed, inputs provided for analysis, and micro services selected to perform root cause analysis of an issue during the exploration; and
         saving the exploration in an evidence package in the storage, wherein the evidence package comprises a collection of explorations including the current exploration;
      determining a predicted list of recommended micro services for the exploration using the processor that executes a machine learning algorithm to perform an analysis of the evidence package comprising the collection of explorations in the storage;
      receiving a second request to perform the exploration in the predictive and maintenance service application, the second request occurring after the first request;
      in response to the receiving the second request, in a recommendation engine, automatically identifying a list of micro services based on the determined predicted list of recommended micro services for the exploration, wherein automatically identifying the list of micro services further comprises:
         clustering, using a clustering algorithm, individual micro services in previously saved successful explorations and evidence packages;
         checking a current list of micro services in the evidence package against the individual micro services clustered by the clustering algorithm; and
         based on checking the current list of micro services, identifying a cluster of the individual micro services that is similar to the current list of micro services in the evidence package, wherein the identified list of micro services further includes the individual micro services in the identified cluster; and displaying, via the GUI, the list of micro services as recommendations for performing the exploration in the predictive and maintenance service application.

15. The computer system of claim 14, wherein a micro service is a variant of service-oriented architecture that structures an application corresponding to the micro service as a collection of loosely coupled services.

16. The computer system of claim 14, wherein performing the exploration in the predictive and maintenance service application the processor further executes the program code to perform operations comprising:

adding a sequence of explorations in an evidence package, wherein the evidence package includes the list of recommended micro services for each exploration determined by executing the machine learning algorithm; and storing the exploration along with a status in the storage.

17. The computer system of claim 16, wherein the processor further executes the program code to:

in a recommendation engine:
provide the evidence package as input to the machine learning algorithm, wherein the evidence package includes micro-level metadata corresponding to the exploration in the predictive and maintenance service application.

18. The computer system of claim 17, wherein the recommendation engine is a machine language based filtering system that predicts the list of micro services to perform the exploration.

* * * * *